Figure 3:
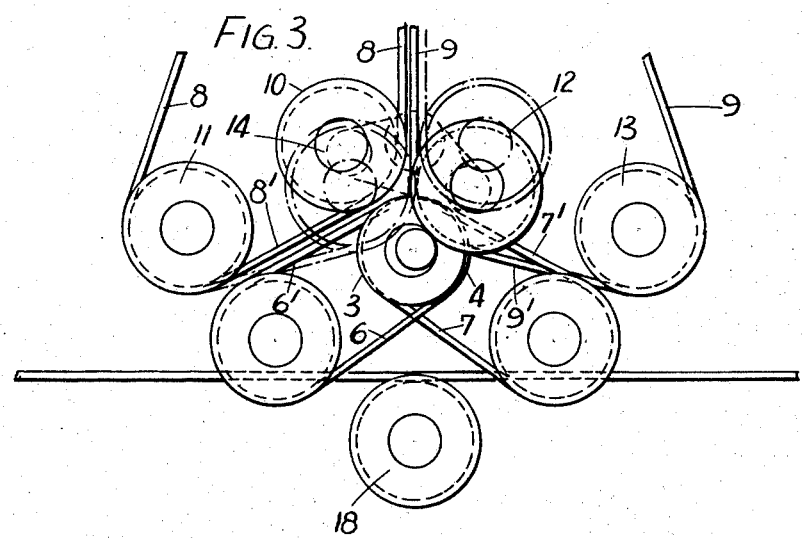

Aug. 7, 1951  C. H. SKINNER  2,563,498
SHEET DEFLECTING MECHANISM
Filed Jan. 7, 1948  2 Sheets-Sheet 1
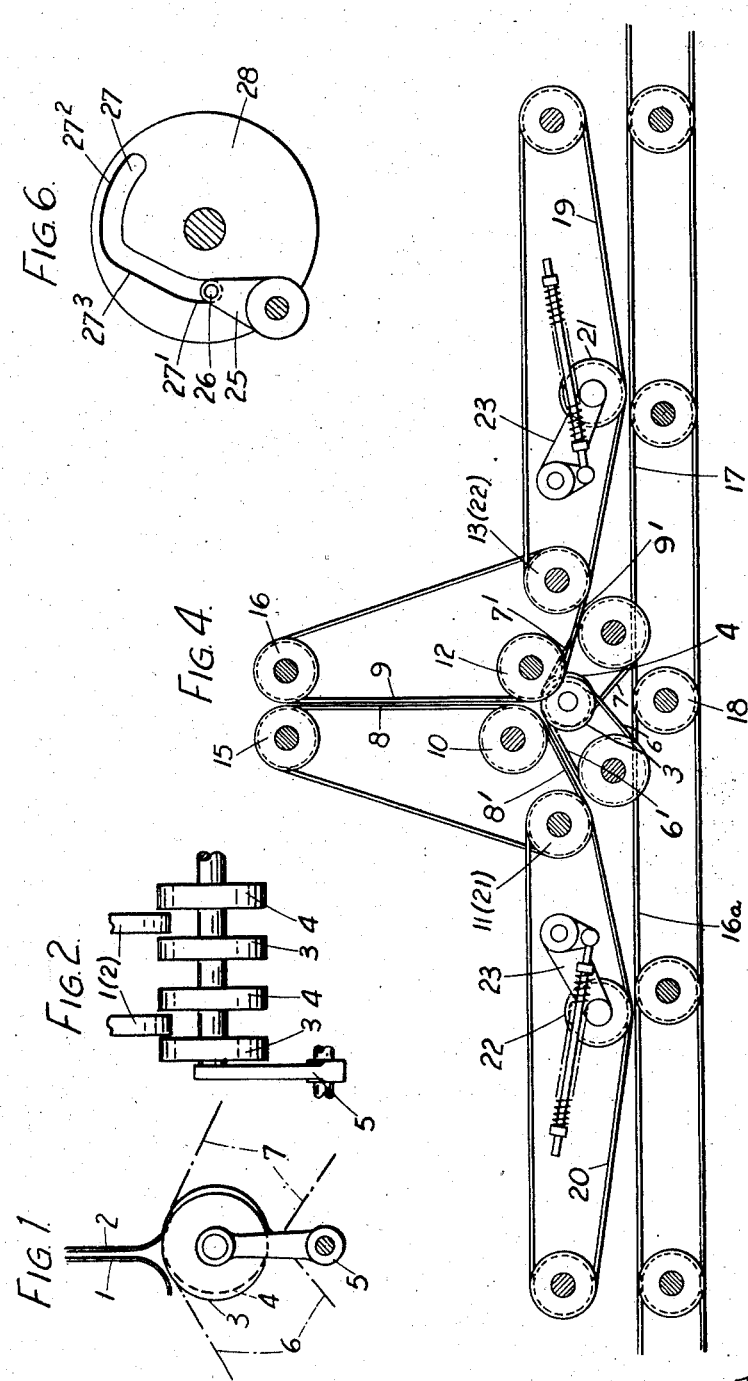
INVENTOR
Charles H. Skinner
BY Albert J. Norton
ATTORNEY.

Aug. 7, 1951 C. H. SKINNER 2,563,498
SHEET DEFLECTING MECHANISM
Filed Jan. 7, 1948 2 Sheets-Sheet 2

INVENTOR
Charles H. Skinner
BY Albert J. Norton
ATTORNEY

Patented Aug. 7, 1951

2,563,498

UNITED STATES PATENT OFFICE 2,563,498

SHEET DEFLECTING MECHANISM

Charles Henry Skinner, London, England, assignor to R. Hoe & Co. Inc., New York, N. Y., a corporation of New York Application January 7, 1948, Serial No. 963
In Great Britain September 19, 1946

Section 1, Public Law 690, August 8, 1946
Patent expires September 19, 1966

13 Claims. (Cl. 271—64)

This invention relates to improvements in mechanism for deflecting, in different directions, products issuing in a stream from a machine: the invention is more especially concerned with mechanism to deflect, at counted batch intervals, the printed and usually folded products of a printing machine, the purpose of deflection being to separate the continuous stream of products into counted batches moving in different paths.

Deflectors have already been proposed for this purpose and it has been common to employ deflectors which are moved periodically across the line of approach of the products to the deflector but are otherwise stationary. Usually also the deflectors are arranged so as to require a relatively large movement about their ends presented to and moved across the oncoming products and this necessitates a very rapid movement to effect a change in position in sufficient time to handle the products of a modern printing press with its high rate of delivery of products to the deflector. Moreover the deflectors operate merely to change the direction of the products and do not exercise any other control on them, the products being carried forward by their own momentum.

Now according to the main feature of this invention a deflector is constituted by two (or sets of two) constantly moving surfaces which move, at their operative or presented part at least, along paths disposed about the line of approach to them of the products to be deflected, the two surfaces moving in different direction but in a general sense away from the oncoming products; in addition mechanism is provided to change at intervals the relative setting between the two surfaces and the oncoming products so that first one and then the other surface is rendered operative to lead them first in one direction and then in the other.

The surfaces would be moved at a rate equal to the rate at which the products pass to them so that the products are not subjected, on their deflection, to an arresting action on meeting the deflection surface; the deflecting surfaces can be formed by the peripheries of oppositely rotating discs but it is preferred to constitute the deflecting surfaces by two endless continuously driven belts (or wires) which pass over two guide rollers. It is preferred to employ belts (or wires) and in such a case the belts operate conjointly with other belts to maintain control on the products as they are deflected and moreover the products are led to the deflecting arrangement by belts (or wires) which can be extended to constitute the said other belts cooperating with the belts forming the deflecting surfaces so that the products are maintained under control both as they pass to the deflector arrangement and as they pass to the control of that arrangement.

Figure 5:
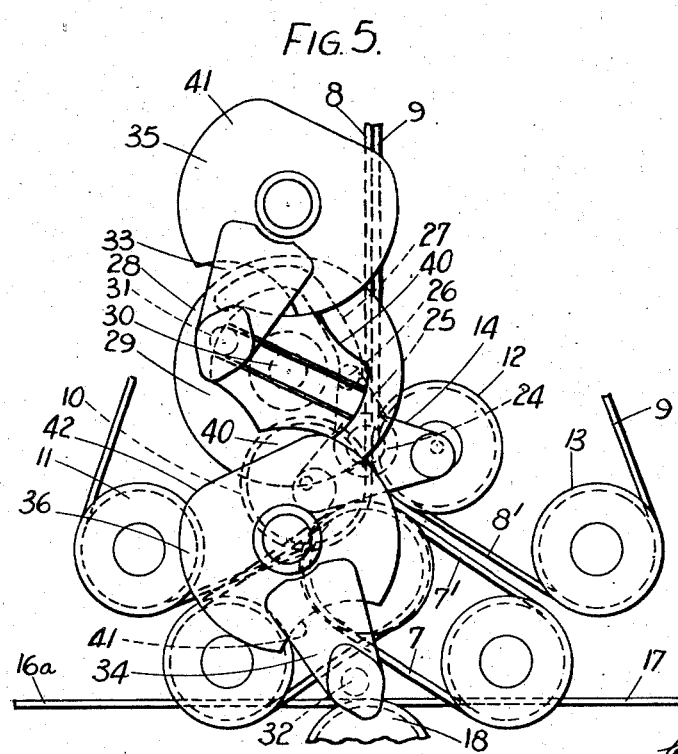

The invention is illustrated in the accompanying drawings in which Figures 1 and 2 are diagrammatic views of one arrangement, Figure 3 an end elevation of a modified and preferred arrangement, Figure 4 is a diagrammatic view showing the deflecting arrangement as incorporated in a complete delivery system, and Figures 5 and 6 are views of a mechanism to control the operation of the deflection arrangement.

Referring firstly to Figures 1 and 2, the references 1, 2 indicate guides between which products pass as for example from the folding-off rollers of the folding mechanism of a printing machine.

Disposed at the discharge end of the guides is disposed a deflector device which comprises two discs 3, 4 (or sets of such discs) which are rotated in opposite directions and are rotatable about axes which are spaced apart on a line transverse to the length of the guides 1, 2 and hence to the line of approach of products between them. Thus one disc 3 is on one side slightly proud of or beyond the periphery of the other disc 4 and similarly the disc 4 is on one side slightly proud of or beyond the periphery of the disc 3: the direction of rotation of the discs is such that the proud sides of the two discs move in opposite directions but both in a general sense away from the guides 1, 2.

The discs are carried by a rocking frame 5 which can be operated to carry them first "across" one guide 2 as shown in Figure 1 and then across the other guide 1, this operation being effected at intervals related to the frequency at which products are to be diverted first in one direction and then in the other direction.

It will be clear that with the position of the parts shown in Figure 1, the oncoming products passing down between the guides 1, 2 have presented to them the proud periphery of the disc 3 which moving in an anti-clockwise direction carries the product to the left whence it passes away between the moving surface of the disc and the end of the guide 1. Similarly when the frame 5 is rocked, the proud periphery of the disc 4 presents a moving surface to the products and deflects them away to the right. It will be clear also that since the discs pass across the guides 1, 2 then when one disc (e. g. the disc 3 in Figure 1) is presented and provides with the appertaining guide (e. g. the guide 1 of Figure 1)

to provide for the passing on of the product, it cooperates at the same time with the other guide (e. g. the guide 2) to present a complete obstruction to the passing of the product in the other direction.

While the peripheries of the discs could be used to constitute the moving deflecting surfaces, it would be preferable to employ belts (or wires) as indicated at 6, 7 in which case the discs constitute in effect pulleys. These belts not only provide the deflecting surfaces but also carry on the products as they pass in their direction of deflection and may serve to drive the discs 3 and 4.

Reference will now be made to Figure 3 which incorporates the belt 6, 7 and also other belts (or wires) which cooperate to maintain control over the products as they pass to and as they are deflected by the deflecting arrangement.

In the arrangement shown in Figure 3, the guides 1, 2 are replaced by endless belts (or wires) 8, 9 which pass about pulleys 10, 11 and 12, 13. These belts 8, 9 parallel with one another from the delivery point of the machine (which may be constituted by folding-off rollers) to the rollers 10, 12 where they diverge to run each alongside operative or deflecting runs of the belts 6, 7, thus forming two secondary runs that may be used alternately or in succession.

In this arrangement change in the direction of deflection of the products is effected by moving the pulleys 10, 12 to cause the products to be presented to one or other deflecting belt 6, 7, that drive the pulleys 3, 4 which, in the form shown in Figures 3 to 5, rotate on fixed axes. The two rollers 10, 12 are mounted in transverse separation in a frame 14 supported to swing about an axis on the mean line of approach formed between the two belts 8, 9 and the action of rocking the frame 14 causes the pulleys 10, 12 to pass alternatively the one clear of the peripheries of the pulleys 3, 4 and the other "across" or below the peripheries of those pulleys so as respectively to provide a pathway and an obstruction to the oncoming products. Thus in the position of the parts shown in Figure 3, the pulley 10 has been raised and the operative run 8' of its belt 8 is moved to a position to provide with the deflecting run 6' of the belt 6 a pathway for the products. The pulley 12 having passed across the periphery of the pulleys 3, 4 provides an obstruction which ensures that the products shall pass only in the intended direction of deflection, i. e. in the direction of the operative run 6' of the belt 6. When the frame 14 is reversed, the pulley 10 provides an obstruction which ensures the passing of the products in the direction of the deflecting run 7' of the belts 7.

The arrangement of Figure 3 ensures control over the product firstly while it is passing down between the belts 8, 9 that control being maintained as the products are presented for deflection and as they are taken under control between the runs 8', 6' or 7', 9' of the belts 8, 9, 6 and 7.

The deflecting mechanism of this invention is capable of general application. It can for example be employed in arrangements where the deflector is intended to deliver products in counted batches first to a conveyor belt moving in one direction and then to a conveyor belt moving in another direction giving as a result counted batches at two separate delivery points.

Such an application is illustrated in Figure 4 where the belts 8, 9 are shown as extended up to return pulleys 15, 16 disposed below or themselves constituting the folding-off rollers of a printing machine while the cooperating runs 6', 8' and 7' 9' deliver the products respectively to conveyor belts 16a, 17 extending in opposite directions from return pulleys 18. Control belts 19, 20 pass respectively under pulleys, 21, 22 each of which is carried by a spring loaded frame 12 operating in known manner yieldingly to hold the control belts 19, 20.

Reference is now made to Figure 5 illustrating one mechanism by which the frame 5 of the arrangement shown in Figures 1 and 2 or the frame 14 of the arrangement shown in Figures 3 and 4 can be rocked. In this figure which shows the frame 14 mounted on trunnions 24 having an arm 25 fitted with a bowl 26 engaging in a closed cam track 27 in a disk 28. The disc 28 is fast with a Geneva block 29 having a groove 30 into which pass alternately driving pins 31, 32 or arms 33, 34 on discs 35, 36. The discs 35, 36 are disposed on opposite sides of the Geneva block and rotate in the same direction and the discs are driven together from some part of the printing machine. Thus as the discs 35, 36 rotate, their respective pins 31, 32 in passing into and through the groove 30 turn the Geneva block 29 first in one direction and then in the other direction at intervals: the Geneva block 29 is formed with arcuate recesses 40 to mate with the periphery of the discs 35, 36 so as in the fashion of a Geneva motion to hold the block 29 and hence the frame 14 against movement in the interval between the operation of the pins entering the slots and the discs are mutilated at 41 to clear the Geneva block as the pins pass into the groove to turn the block.

The cam track 27 is provided to accelerate the movement imparted by the Geneva block to the frame 14. Thus the cam track has an inner and an outer portion 27', 27² concentric with the axis of rotation of the block so that while the bowl 26 is in those parts the motion of the Geneva block is an idle one, the movement of the block being utilized in that fractional part where the follower passes along the part 27³ of the track joining the inner and the outer parts.

What I claim is:

1. Mechanism comprising means to direct a stream of articles in a line, a deflector device disposed across the line and comprising two deflecting rollers, means mounting the rollers in off-set relation to one another, means to rotate the rollers in opposite directions, and means to effect relative movement between the directing means on the one hand and the two rollers on the other hand to present the periphery of one roller to a group of articles approaching the deflector device and then to present the periphery of the other roller to the next group of approaching articles.

2. Mechanism comprising guides to constrain a stream of articles, a deflector device disposed across the delivery from said guides, the deflector comprising two deflector components, means to move the components continuously in opposite directions from each other and in different directions from the direction of approach of the articles to the device, and means to effect relative bodily movement between the guides on the one hand and the deflector devices on the other hand to position the deflector components respectively to provide conjointly with the guides a closure in one direction and a moving pathway in the other direction.

3. Mechanism comprising guides to constrain a stream of articles, a deflector device disposed across the delivery from said guides, the deflector comprising two deflecting rollers, means to rotate the rollers continuously in opposite directions, and means to effect relative bodily movement between the guides on the one hand and the deflector device on the other hand to position the deflector rollers respectively to provide conjointly with the guides a closure in one direction and a moving pathway in the other direction.

4. Mechanism comprising guides to constrain a stream of articles, a deflector device disposed across the delivery from said guides, the deflector comprising two endless bands, means training the bands to guide their surfaces where they cross the delivery from the guides in different directions away from that delivery, means to move the bands continuously in opposite directions, and means to effect bodily relative movement between the guides on the one hand and the deflector on the other hand to position the surface of one band in closed relation to the guides and the other band in open relation with the guides and vice versa.

5. Mechanism comprising a pair of endless bands, guides about which the bands are trained from a parallel run to divergent runs, a deflector device which is disposed across the discharge from the parallel run and which comprises two endless bands running in opposite directions and having runs to pass parallel respectively with the divergent runs of the first bands, means to move the bands continuously so that the associated parallel runs move in the same direction, and means to move the guides on the one hand and the deflector device on the other hand to cause one deflector band to close on to its associated divergent run of one first band and simultaneously to cause the other deflector band to open from its associated divergent run of the other first band.

6. Mechanism comprising a pair of endless bands, a frame having guide rollers to train the endless bands from a parallel run to divergent runs, a deflector device disposed adjacent the guide rollers and comprising two other rollers in offset relation and an additional pair of endless bands trained about the said other rollers, additional rollers to constrain the additional bands to extend in the same sense as the divergent runs, means to move all the bands continuously and means to move the frame to close one divergent path between one of each pair of endless bands and to open another divergent path between the other one of each pair of endless bands.

7. Mechanism comprising a pair of endless bands, a frame having guide rollers to train the endless bands from a parallel run to divergent runs, means mounting the frame for pivotal movement, a deflector device disposed adjacent the guide rollers and comprising two other rollers in offset relation and an additional pair of endless bands trained about the said other rollers, additional rollers to constrain the additional bands to extend in the same sense as the divergent runs, means to move all the bands continuously and means to rock the frame to close one divergent path between one of each pair of endless bands and to open another divergent path between the other one of each pair of endless bands.

8. Mechanism comprising a pair of endless bands, a frame having guide rollers to train the endless bands from a parallel run to divergent runs, a deflector device disposed adjacent the guide rollers and comprising two other rollers in offset relation and an additional pair of endless bands trained about the said other rollers, additional rollers to constrain the additional bands to extend in the same sense as the divergent runs, means to move all the bands continuously and a Geneva motion to move the frame to close one divergent path between one of each pair of endless bands and to open another divergent path between the other one of each pair of endless bands.

9. Mechanism comprising a pair of endless bands, a frame having guide rollers to train the endless bands from a parallel run to divergent runs, means mounting the frame for pivotal movement, a deflector device disposed adjacent the guide rollers and comprising two other rollers in offset relation and an additional pair of endless bands trained about the said other rollers, additional rollers to constrain the additional bands to extend in the same sense as the divergent runs, means to move all the bands continuously, and a Geneva motion to rock the frame to close one divergent path between one of each pair of endless bands and to open another divergent path between the other one of each pair of endless bands.

10. Mechanism comprising a pair of endless bands, a frame having guide rollers to train the endless bands from a parallel run to divergent runs, a deflector device disposed adjacent the guide rollers and comprising two other rollers in offset relation and an additional pair of endless bands trained about the said other rollers, additional rollers to constrain the additional bands to extend in the same sense as the divergent runs, means to move all the bands continuously, a Geneva motion to move the frame to close one divergent path between one of each pair of endless bands and to open another divergent path between the other one of each pair of endless bands and a cam mechanism interposed between the Geneva motion and the frame to accelerate the movement of said frame.

11. Mechanism comprising a pair of endless bands, a frame having guide rollers to train the endless bands from a parallel run to divergent runs, means mounting the frame for pivotal movement, a deflector device disposed adjacent the guide rollers and comprising two other rollers in offset relation and an additional pair of endless bands trained about the said other rollers, additional rollers to constrain the additional bands to extend in the same sense as the divergent runs, means to move all the bands continuously, a Geneva motion to rock the frame to close one divergent path between one of each pair of endless bands and to open another divergent path between the other one of each pair of endless bands and a cam mechanism interposed between the Geneva motion and the frame to accelerate the movement of said frame.

12. Mechanism comprising means to direct a continuous stream of articles in a line, a deflector device disposed across the line and comprising two deflecting rollers, means mounting the rollers in offset relation to one another, means to rotate the rollers in opposite directions, and a Geneva motion to effect relative movement between the directing means on the one hand and the two rollers on the other hand to present the peripheries of the rollers alternately to the stream of articles.

13. In a conveying device arranged to conduct products to either a first or a second destination, parallel guides forming a path which the products follow to a deflecting area, first and second pulleys rotatably supported in the area with their axes in staggered relation and driven in opposite directions, first and second belts associated with the first and second pulleys respectively to conduct the products from the deflecting area to the said destinations, and means for moving the axes of the first and second pulleys across the said path to change the destination of products approaching the pulleys.

CHARLES HENRY SKINNER.

REFERENCES CITED

The following references are of record in the file of this patent:

UNITED STATES PATENTS

| Number | Name | Date |
|---|---|---|
| 815,008 | Davidson | Mar. 13, 1906 |
| 1,856,978 | Terry | May 3, 1932 |
| 1,858,416 | Rapley | May 17, 1932 |
| 2,251,596 | O'Malley | Aug. 5, 1941 |

FOREIGN PATENTS

| Number | Country | Date |
|---|---|---|
| 603,939 | Germany | Oct. 12, 1934 |